(12) United States Patent
Shim et al.

(10) Patent No.: US 7,450,958 B2
(45) Date of Patent: Nov. 11, 2008

(54) METHOD FOR DISPLAYING RECEIVED SIGNAL STRENGTH BARS IN WIRELESS TERMINAL DEVICE

(75) Inventors: In-Seok Shim, Suwon-shi (KR); Sang-Woo Ryu, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 757 days.

(21) Appl. No.: 10/681,980

(22) Filed: Oct. 9, 2003

(65) Prior Publication Data

US 2004/0102167 A1 May 27, 2004

(30) Foreign Application Priority Data

Nov. 26, 2002 (KR) .................. 10-2002-0073889

(51) Int. Cl.
*H04B 7/00* (2006.01)
(52) U.S. Cl. ................. 455/513; 455/157.2; 455/226.4; 455/226.2; 455/134; 455/115.3
(58) Field of Classification Search ... 455/154.1–158.1, 455/513, 226.4, 226.2, 134, 115.3, 115.4, 455/161.3
See application file for complete search history.

(56) References Cited

U.S. PATENT DOCUMENTS

| | | | | |
|---|---|---|---|---|
| 5,142,695 | A | * | 8/1992 | Roberts et al. ............... 455/437 |
| 6,035,183 | A | * | 3/2000 | Todd et al. ................ 455/226.2 |
| 6,064,890 | A | * | 5/2000 | Hirose et al. ................ 455/513 |
| 6,067,449 | A | * | 5/2000 | Jager ...................... 455/277.2 |
| 6,138,024 | A | * | 10/2000 | Evans et al. ............... 455/452.2 |
| 6,246,867 | B1 | * | 6/2001 | Jakobsson .................. 455/324 |
| 6,275,519 | B1 | * | 8/2001 | Hendrickson ................ 375/138 |
| 6,404,826 | B1 | * | 6/2002 | Schmidl et al. .............. 375/340 |
| 6,650,872 | B1 | * | 11/2003 | Karlsson .................. 455/67.11 |
| 6,850,736 | B2 | * | 2/2005 | McCune, Jr. ............. 455/67.13 |
| 2001/0000959 | A1 | * | 5/2001 | Campana, Jr. ............ 340/573.1 |
| 2004/0038650 | A1 | * | 2/2004 | Yang ......................... 455/130 |
| 2004/0053592 | A1 | * | 3/2004 | Reial .......................... 455/303 |
| 2004/0166811 | A1 | * | 8/2004 | Moon ...................... 455/67.11 |
| 2004/0198234 | A1 | * | 10/2004 | Wacker et al. ............ 455/67.13 |
| 2005/0033126 | A1 | * | 2/2005 | Charash ..................... 600/309 |

FOREIGN PATENT DOCUMENTS

DE   WO 02/31992   *  4/2002

\* cited by examiner

*Primary Examiner*—Edward Urban
*Assistant Examiner*—Fayyaz Alam
(74) *Attorney, Agent, or Firm*—The Farrell Law Firm, PC

(57) ABSTRACT

Disclosed is a method for displaying signal strength bars in a wireless terminal device. In the first step, RSSI (Received Signal Strength Indicator) values of the wireless terminal device consecutively collected for a predetermined time T are analyzed, and C/I (Carrier to Interference) ratios consecutively calculated for the predetermined time T are analyzed. In the second step, the number of signal strength bars to be displayed on the wireless terminal device is determined based on the analysis result of the first step. In the third step, the determined number of signal strength bars is displayed on the wireless terminal device. The signal strength bars are displayed in consideration of peripheral interferences around a wireless terminal device, and thus users can see the telephone communication quality or data transfer speed more accurately. In addition, the signal strength bars are displayed based on a predetermined number of C/I ratios and RSSI values consecutively obtained, and thus the instability in the displaying of the signal strength bars can be reduced.

10 Claims, 7 Drawing Sheets

| NO. | RSSI + C/I | C/I | NUMBER OF BARS |
|---|---|---|---|
| 1 | −120 OR LESS | OVERALL RANGE | NO SERVICE |
| 2 | MORE THAN −120, −110 OR LESS | −15 OR LESS | 1 |
| | | MORE THAN −15 | 2 |
| 3 | MORE THAN −110, −105 OR LESS | −15 OR LESS | 1 |
| | | MORE THAN −15, −10 OR LESS | 2 |
| | | MORE THAN −10 | 3 |
| 4 | MORE THAN −105, −100 OR LESS | −15 OR LESS | 1 |
| | | MORE THAN −15, −10 OR LESS | 2 |
| | | MORE THAN −10, −5 OR LESS | 3 |
| | | MORE THAN −5 | 4 |
| 5 | MORE THAN −100, −95 OR LESS | −15 OR LESS | 1 |
| | | MORE THAN −15, −10 OR LESS | 2 |
| | | MORE THAN −10, −5 OR LESS | 3 |
| | | MORE THAN −5, −0 OR LESS | 4 |
| | | MORE THAN −0 | 5 |
| 6 | MORE THAN −95, −90 OR LESS | −15 OR LESS | 1 |
| | | MORE THAN −15, −10 OR LESS | 2 |
| | | MORE THAN −10, −5 OR LESS | 3 |
| | | MORE THAN −5, −0 OR LESS | 4 |
| | | MORE THAN −0, 5 OR LESS | 5 |
| | | MORE THAN 5 | 6 |
| 7 | MORE THAN −90, −85 OR LESS | −15 OR LESS | 2 |
| | | MORE THAN −15, −10 OR LESS | 3 |
| | | MORE THAN −10, −5 OR LESS | 4 |
| | | MORE THAN −5, −0 OR LESS | 5 |
| | | MORE THAN −0 | 6 |
| 8 | MORE THAN −85 | −15 OR LESS | 3 |
| | | MORE THAN −15, −10 OR LESS | 4 |
| | | MORE THAN −10, −5 OR LESS | 5 |
| | | MORE THAN −5 | 6 |

FIG.6

METHOD FOR DISPLAYING RECEIVED SIGNAL STRENGTH BARS IN WIRELESS TERMINAL DEVICE

PRIORITY

This application claims priority to an application entitled "METHOD FOR DISPLAYING RECEIVED SIGNAL STRENGTH BARS", filed in the Korean Industrial Property Office on Nov. 26, 2002 and assigned Serial No. 2002-73889, the contents of which are hereby incorporated by reference.

BACKGROUND OF THE INVENTION

1. Field of the Invention

The present invention relates to a method for displaying received signal strength bars in a wireless terminal device, and more particularly to a method for displaying received signal strength bars in a wireless terminal device taking into consideration the received field strength of the terminal device and interference signals around the terminal device.

2. Description of the Related Art

Generally, a wireless terminal device displays received signal strength bars at a predetermined position on a display unit in order to provide a user with information of its communication quality (e.g., a phone conversation quality) and data transfer speed in real time. That is, the wireless terminal device expresses whether the communication quality or data transfer speed is good or bad by varying the number of bars. In general, a larger number of bars indicates a higher communication quality or data transfer speed, and a smaller number of bars indicate a lower communication quality or data transfer speed.

FIG. 1 is a block diagram schematically showing the configuration of a general wireless terminal device. Referring to FIG. 1, the wireless terminal device includes a database (DB) 10, a receiving unit 20, a controller 30, and a display unit 40. Descriptions of a transmitter, a key input unit, a microphone, and a speaker, which are included in a usual wireless terminal device, are omitted to avoid obscuring this description with unnecessary detail.

The database 10 stores and manages information required for performing a normal operation of the wireless terminal device. The receiving unit 20 receives data from an external network access device (e.g., a base station) and transmits the received data to the controller 30. The controller 30 controls the overall operation of the wireless terminal device. The display unit 40 displays the operation status of the terminal device and externally-inputted information under the control of the controller 30.

FIG. 2 is a flowchart illustrating a method for displaying received signal strength bars of the wireless terminal device according to one example of the prior art. Referring to FIGS. 1 and 2, the prior art method for displaying received signal strength bars is described as follows.

The receiving unit 20 receives predetermined data transmitted from the external network access device such as a base station and transmits the received data to the controller 30. The controller 30 analyzes the data received from the receiving unit 20 to obtain an RSSI (Received Signal Strength Indicator) value in step S10, and, based on the collected RSSI value, determines the number of received signal strength bars to be displayed on the display unit 40 in step S20. To this end, the controller 30 refers to a predetermined reference table stored in the database 10. The predetermined reference table includes information on the number of received signal strength bars previously set in correlation with each of the ranges of the RSSI value.

When the number of signal strength bars for representing the current communication quality or data transfer speed is determined in the step S20, the controller 30 enables the display unit 40 to display the signal strength bars in step S30.

In such a manner, the mobile terminal device of the prior art only refers to the RSSI value in order to display the signal strength bars on its screen. In other words, the conventional method for displaying the signal strength bars does not consider any peripheral conditions such as interference. Therefore, in the prior art, a large number of signal strength bars are displayed if received field strength is high, irrespective of a high intensity of peripheral interferences, whereas a small number of signal strength bars are displayed if received field strength is low, irrespective of a low peripheral interference.

Even when the received field intensity is high, actual communication quality or data transfer speed may be poor provided that the intensity of peripheral interferences is high, but the prior art method will be subject to the error of displaying a large number of signal strength bars in such a case, indicating that the communication quality or data transfer speed is good, and vice versa.

In addition, the prior art method obtains an average RSSI value based on five RSSI values read, and updates the signal strength bars at intervals of 250 ms using the obtained average value, which leads to instability in the displaying of the signal strength bars.

SUMMARY OF THE INVENTION

Therefore, the present invention has been made in view of the above problem, and it is an object of the present invention to provide a method for displaying received signal strength bars in a wireless terminal device, wherein the signal strength bars are displayed taking into account peripheral interferences around the wireless terminal device so as to enable a user to receive more accurate information on the communication quality or data transfer speed, and the signal strength bars are displayed also based on a predetermined number of consecutive RSSI values and C/I (Carrier to Interference) ratios so as to reduce the instability in the displaying of the signal strength bars.

In accordance with the present invention, the above and other objects can be accomplished by the provision of a method for displaying signal strength bars in a wireless terminal device comprising: analyzing RSSI values of the wireless terminal device consecutively collected for a predetermined time T and analyzing C/I ratios consecutively calculated for the predetermined time T; determining a number of signal strength bars to be displayed on the wireless terminal device based on the analysis result of the first step; and displaying said determined number of signal strength bars on the wireless terminal device.

BRIEF DESCRIPTION OF THE DRAWINGS

The above and other objects, features and advantages of the present invention will be more clearly understood from the following detailed description taken in conjunction with the accompanying drawings, in which:

FIG. 6 is a reference table for selection of the number of signal strength bars to be displayed which is used in a method for displaying the signal strength bars according to an embodiment of the present invention.

DETAILED DESCRIPTION OF THE PREFERRED EMBODIMENTS

Figure 1:
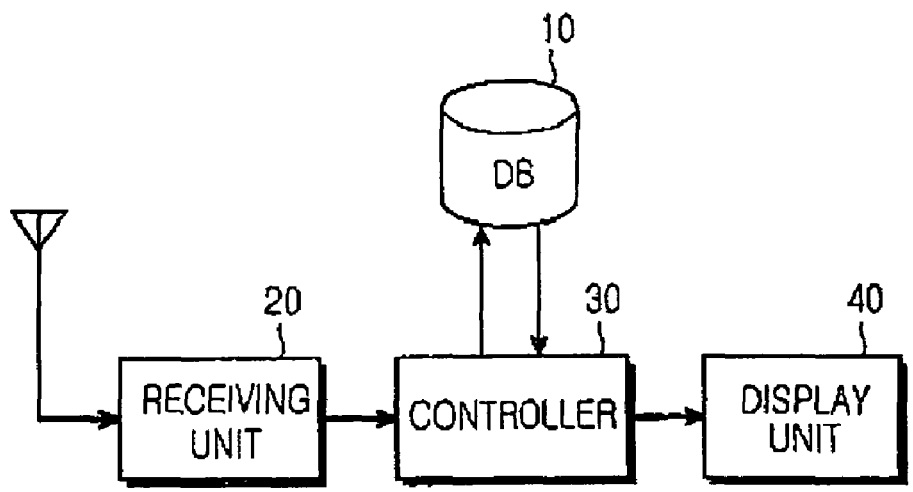
FIG. 1 is a block diagram schematically showing the configuration of a general wireless terminal device.
Figure 2:
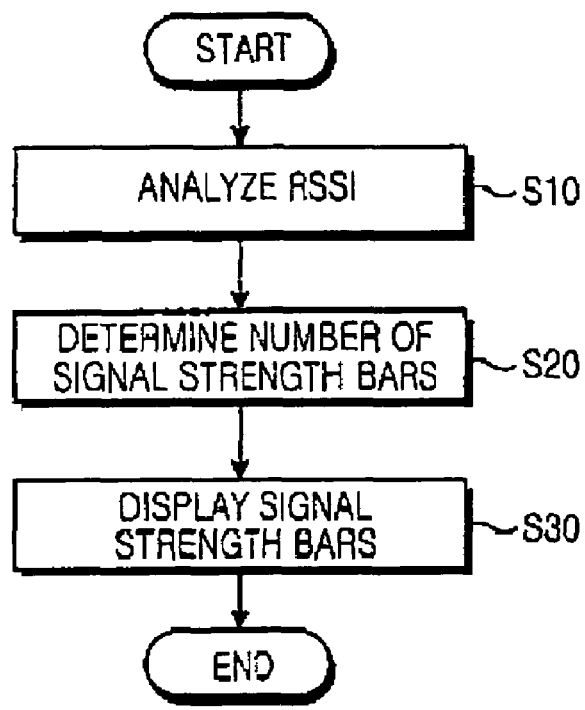
FIG. 2 is a flowchart illustrating a method for displaying received signal strength bars in a wireless terminal device according to one example of the prior art.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 3:
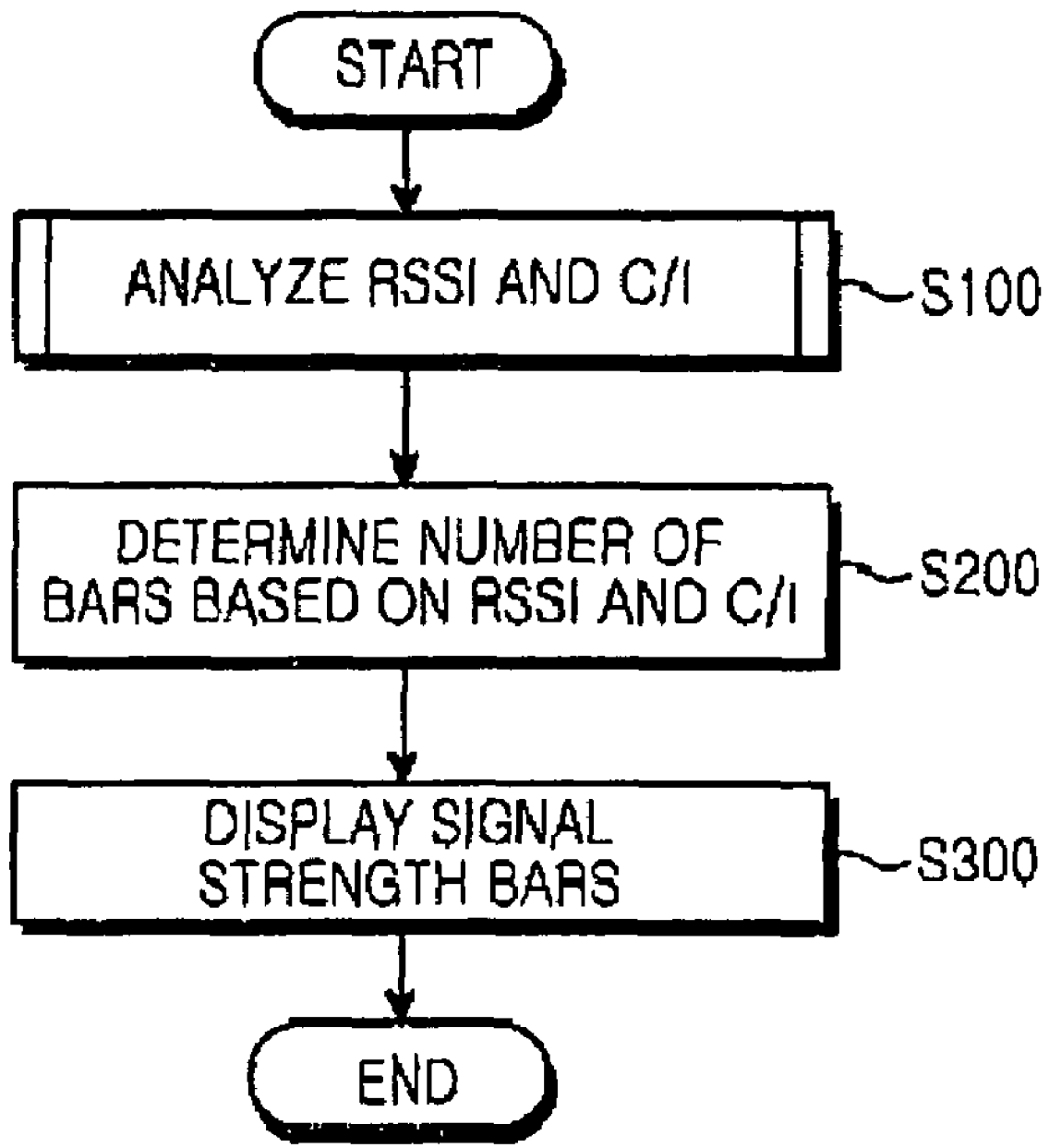
FIG. 3 is a flowchart of a method for displaying received signal strength bars in a wireless terminal device according to one embodiment of the present invention.

FIG. 3 is a flowchart of a method for displaying received signal strength bars in a wireless terminal device according to one embodiment of the present invention. Referring to FIGS. 1 and 3, the procedure of this method according to the present invention is described as follows.

The receiving unit 20 receives predetermined data transmitted from an external network access device such as a base station and transmits the received data to the controller 30. In S100, the controller 30 reads the data received from the receiving unit 20 to analyze RSSI (Received Signal Strength Indicator) values of the terminal device consecutively collected for a predetermined time T and also analyze C/I (Carrier to Interference) ratios continuously calculated for the predetermined time T.

The C/I ratio is a ratio of the intensity of an active pilot signal (or a desired radio (Carrier) signal) with respect to the intensity of interference signals. For example, a C/I ratio of 0 dBm means that the ratio of intensity between the active pilot signal and the interference signal is 1:1, a C/I ratio of 10 dBm means that the ratio is 10:1, and a C/I ratio of −10 dBm means that the ratio is 1:10. That is, the higher the C/I ratio is, the higher the communication quality or data transfer speed is.

After analyzing the RSSI values and the C/I ratios, the controller 30 determines the number of signal strength bars to be displayed on the wireless terminal device based on the analysis result in step S200. The controller 30 refers to a predetermined reference table stored in a database 10. The predetermined reference table includes information on the number of received signal strength bars previously set in correlation with each of the ranges of RSSI values and each of the ranges of C/I ratios. FIG. 6 shows one example of the predetermined reference table.

Referring to FIG. 6, it can be seen that the present invention sets the number of signal strength bars based on both the C/I ratio and the sum of the RSSI value and the C/I ratio. The reference table shown in FIG. 6 is only illustrative and the present invention is not limited thereto. In other words, for each range of RSSI values and for each range of C/I ratios, the number of signal strength bars corresponding to each of the ranges may be set differently from those of FIG. 6.

When the number of signal strength bars for displaying the current communication quality or data transfer speed is determined in step S200, the controller 30 enables the display unit 40 to display the signal strength bars in step S300.

Such a series of steps S100 to S300 is repeated until the wireless terminal device receives a termination instruction. For example, the steps S100 to S300 are repeated until the wireless terminal device is powered off. Because the RSSI values and the C/I ratios are continuously analyzed for the predetermined time T in step S100, the period of repeating the series of steps S100 to S300 is more than the predetermined time T. Accordingly, the period of updating the signal strength bars displayed on the display unit 40 is at least more than the predetermined time T.

Figure 4:
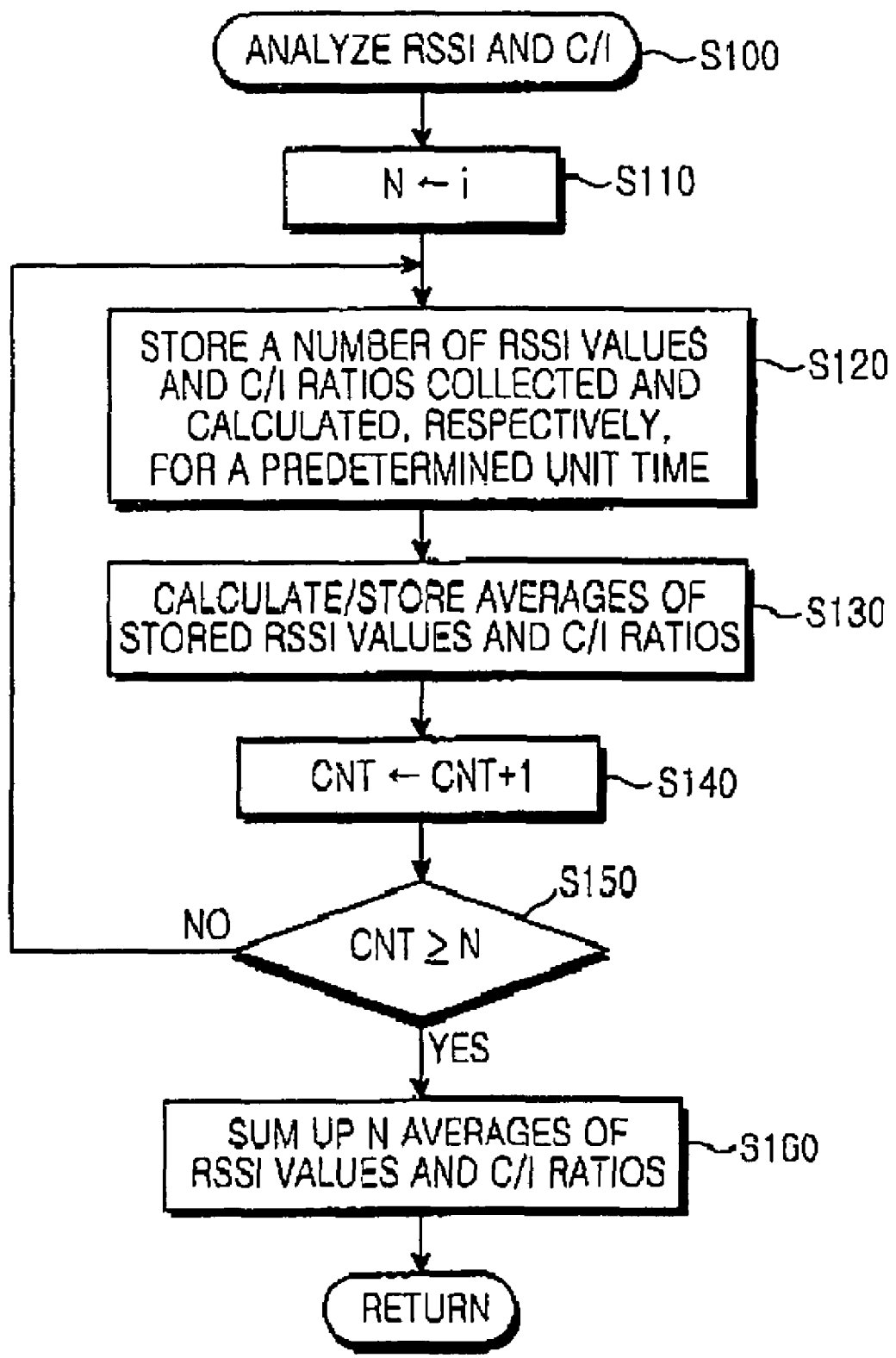
FIG. 4 is a flowchart of analyzing C/I ratios and RSSI values according to an embodiment of the present invention.

FIG. 4 is a flowchart showing additional detail of the procedure of the step S100 of FIG. 3 for analyzing the C/I ratios and RSSI values of the wireless terminal device according to the embodiment of the present invention. Referring to FIG. 4, as a first step for analyzing the RSSI values and the C/I ratios of the wireless terminal device according to the present invention, a value N for limiting the number of RSSI values and the C/I ratios to be analyzed is set in step S110. That is, in consideration that the step S100 is performed for the limited time (i.e. predetermined time T), the step S110 is performed to limit the number of RSSI values and the C/I ratios to be analyzed for the predetermined time T.

The predetermined time T is information corresponding to a basic value to set the update period of the signal strength bars displayed on the wireless terminal device. Thus, it is preferable to set the predetermined time T to 1.2 sec equal to an update period of the signal strength bars of mobile phones usually and currently used, and to set the value N to 5 based on the set predetermined time T of 1.2 sec.

After performing the step S110, in step S120, a predetermined number of RSSI values of the wireless terminal device are consecutively collected for a predetermined unit time t within the period of T and the RSSI values are stored, while a predetermined number of C/I ratios included in the signals received by the wireless terminal device are consecutively calculated for the predetermined unit time t and the calculated C/I ratios are stored. Preferably, the predetermined unit time t is set to 240 ms in consideration that the predetermined time T is 1.2 sec and the value N is 5, and each of the number of the RSSI values collected for the predetermined unit time t (240 ms) and the number of the C/I ratios calculated for the same time t (240 ms) is set to 8. It is also preferable to collect and calculate the 8 RSSI values and the 8 C/I ratios, respectively, for each period of 30 ms.

Such settings of values are based on the operating characteristics of currently used terminals, and thus different settings are possible as the communication environment varies.

In step S130, a calculation is performed to obtain an average value of the predetermined number of RSSI values (RSSI_AVR) collected in step S120 and an average value of the predetermined number of C/I ratios (C/I_AVR) calculated in step S120, and the obtained average values are stored.

For the sake of simpler calculation, it is preferable to use RSSI values and C/I ratios, and exclude the maximum and minimum values of each of the RSSI values and the C/I ratios, in the calculation of the average values RSSI_AVR and C/I_AVR in step S130.

It is also preferable to use n higher RSSI values and n higher C/I ratios among the predetermined number of RSSI values and the predetermined number of C/I ratios, respectively, in the calculation of the average values RSSI_AVR and C/I_AVRin step S130. This is to take into account, in determining the number of signal strength bars, the fact that, even when the average values RSSI_AVR and C/I_AVR are fixed, the communication quality or data transfer speed varies as each of the RSSI values and the C/I ratios varies.

In detail, when each of the average values RSSI_AVR and C/I_AVR is equal to 10, two cases can be considered. The first case is that the RSSI values and the C/I ratios are all 10, and the second case is that the RSSI values are paired values of 5 and 15 and the C/I ratios are paired values of 5 and 15. A fact to be noted is that the second case has higher communication quality or data transfer speed, as compared with the first case. The procedure depicted in the flow chart can preferably further modified to take into account such fact in determining the number of signal strength bars, with the average values RSSI_AVR and C/I_AVR being calculated using a value n that is higher than the value N which was set for limiting the number of RSSI values and C/I ratio, as described above. The n higher number of RSSI values and n higher number of C/I ratios can be for example, 15.

The steps S120 and S130 are repeated a number of times equal to the value N (=5) set in step S110. To this end, a variable CNT is defined to count the number of times the steps S120 and S130 have been performed. The variable CNT is increased by one each time the steps S120 and S130 are performed in step S140, and then the variable CNT is compared with the value N in step S150.

The steps S120 to S150 are repeated while the variable CNT is less than N. When the CNT becomes equal to N, analysis results of the RSSI values and the C/I ratios are obtained in step S160. For example, the step S160 is performed in such a manner that N number of average values (RSSI_AVR) obtained by the repeated executions of step S130 are summed up and the sum of the average values is obtained as an analysis result of the RSSI values collected for the predetermined time T, while N number of average values (C/I_AVR) obtained by the repeated executions of step S130 are summed up and the sum of the average values is obtained as an analysis result of the C/I ratios calculated for the predetermined time T.

Figure 5A:
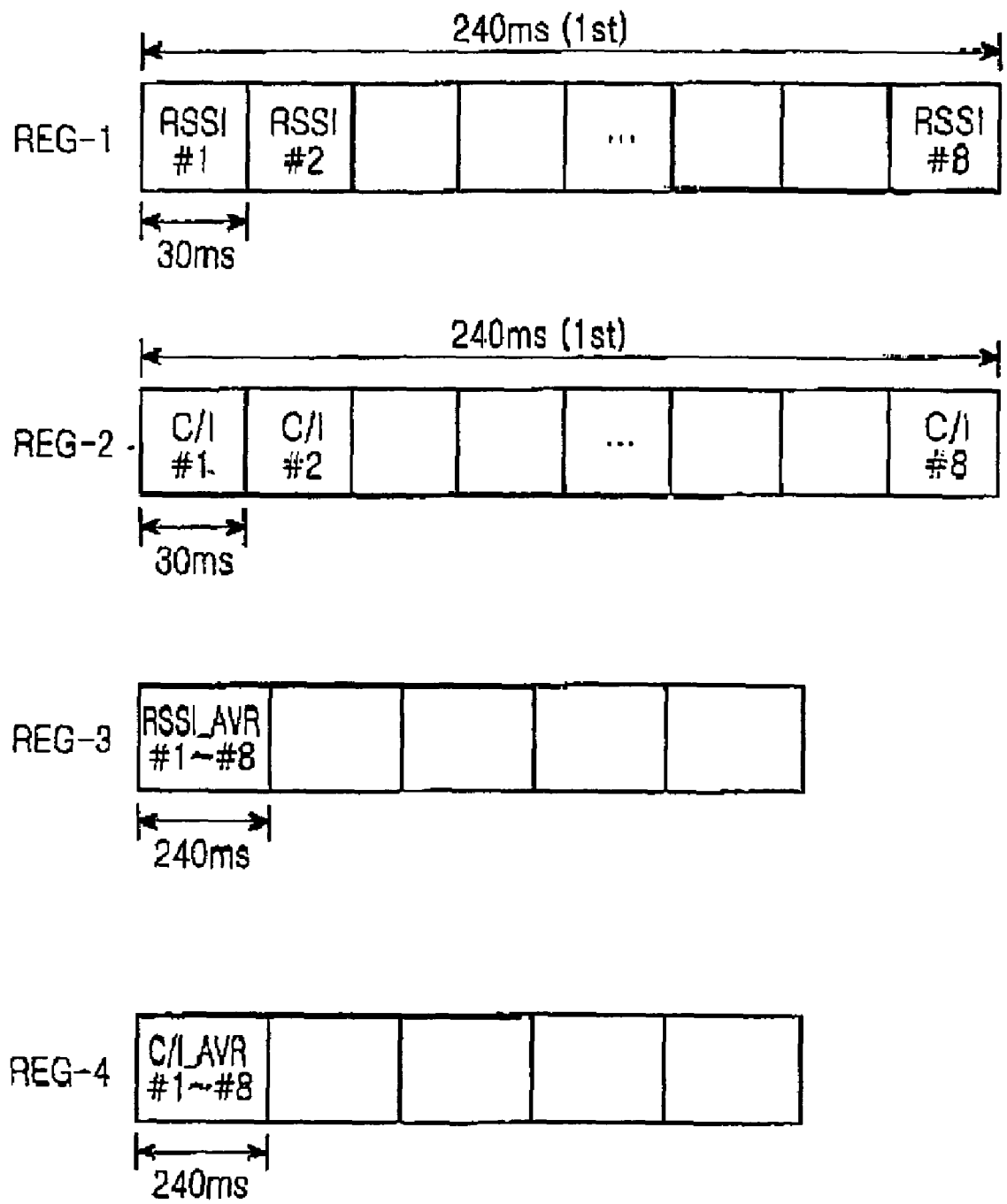
FIGS. 5A to 5C are detailed examples of the procedure of analyzing C/I ratios and RSSI values according to an embodiment of the present invention.
Figure 5B:
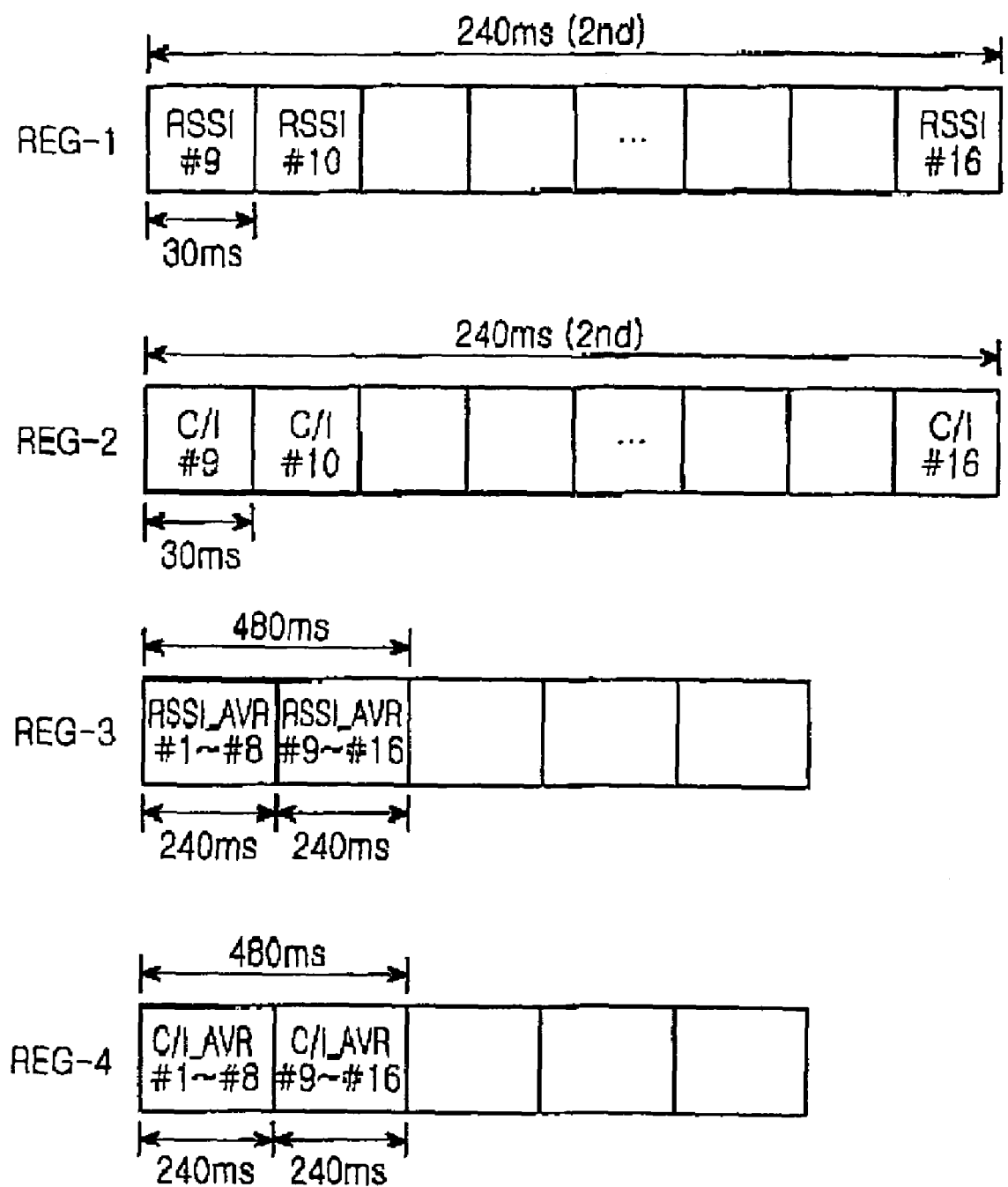
Figure 5C:
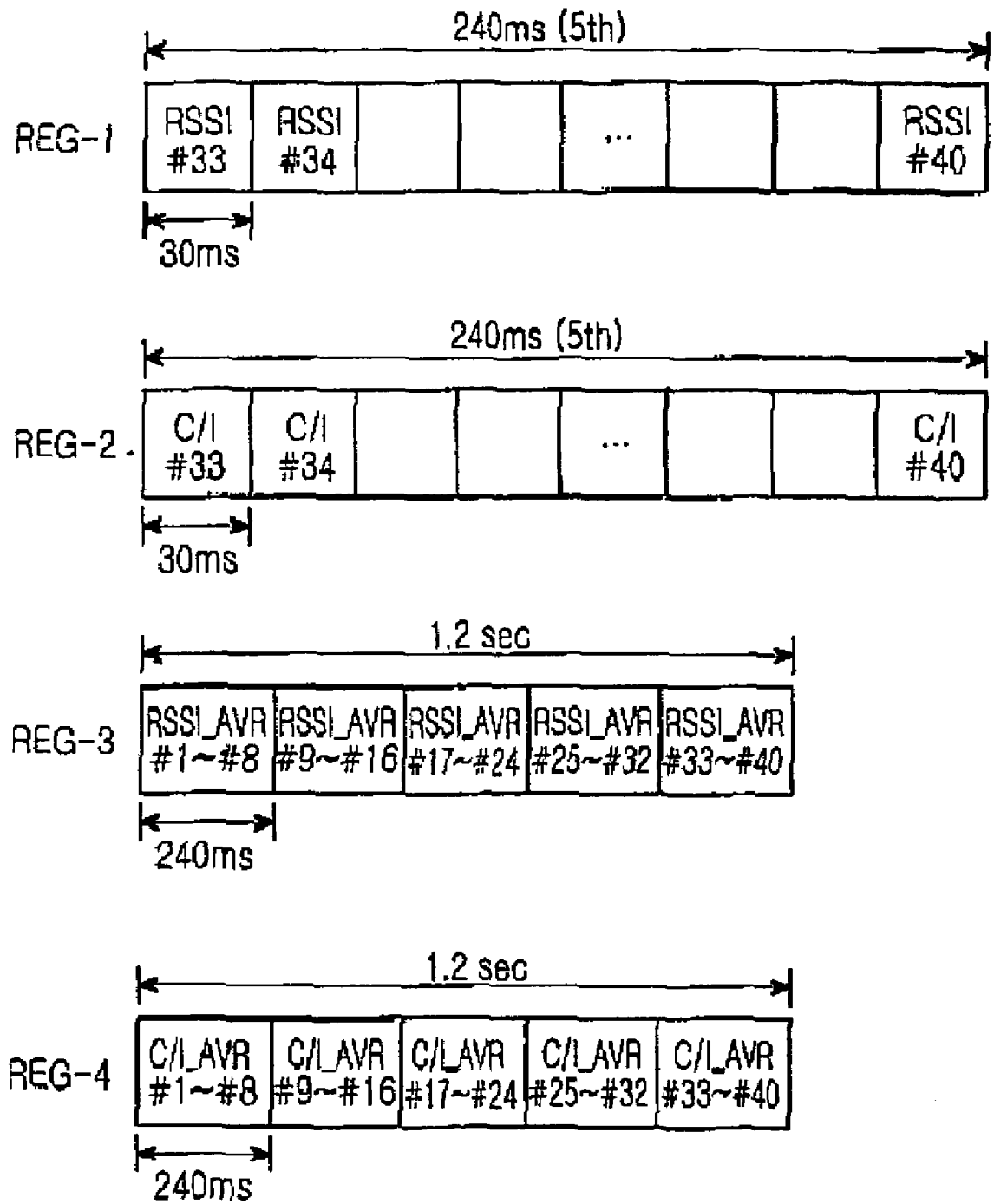

FIGS. 5A to 5C are detailed examples of the procedure of analyzing the RSSI values and the C/I ratios of the wireless terminal device according to the embodiment of the present invention. In this example of FIGS. 5A to 5C, 8 RSSI values collected for the predetermined unit time t (=240 msec) are stored in a register-1 (REG-1), 8 C/I ratios calculated for the predetermined unit time t (=240 msec) are stored in a register-2 (REG-2), 5 average values (RSSI_AVR) of the 8 RSSI values stored in the register-1 (REG-1) are stored in a register-3 (REG-3), and 5 average values (C/I_AVR) of the 8 C/I ratios stored in the register-2 (REG-2) are stored in a register-4 (REG-4).

FIG. 5A shows the storing status of each of the registers (REG-1 to REG-4) when a first unit time t (t=240 ms) has passed, FIG. 5B shows the storing status of each of the registers (REG-1 to REG-4) when a second unit time t (t=240 ms) has passed, FIG. 5C shows the storing status of each of the registers (REG-1 to REG-4) when a fifth unit time t (t=240 ms) has passed, i.e., when the predetermined time T (=1.2 sec) has passed.

Like the example of FIGS. 5A to 5C, the present invention determines the number of signal strength bars to be displayed by the wireless terminal device based on a predetermined number (e.g. 40) of each of consecutive RSSI values and C/I ratios obtained for the predetermined time (T=1.2 sec)

FIG. 6 is a detailed example of the reference table for selection of the number of signal strength bars to be displayed which is used in a method for displaying the signal strength bars according to the present invention as mentioned in step S200 of FIG. 3. Referring to FIG. 6, it is apparent that the number of signal strength bars is determined based on the RSSI values and C/I ratios analyzed for the predetermined time T (T=1.2 sec) in the procedure of FIGS. 3, 4 and 5A to 5C.

As apparent from the above description, because signal strength bars are displayed in consideration of peripheral interferences around a wireless terminal device, thus displaying of the communication quality or data transfer speed more accurately, the present invention has an advantage in that users can see telephone communication performances more accurately. In addition, because the signal strength bars are updated at intervals of a predetermined time (e.g. 1.2 sec) based on a predetermined number (e.g. 40) of each of C/I ratios and RSSI values consecutively obtained for the predetermined time (e.g. 1.2 sec), the present invention has an advantage in that the instability in the displaying of the signal strength bars is reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for displaying signal strength bars in a wireless terminal device comprising:

analyzing RSSI (Received Signal Strength Indicator) values of the wireless terminal device consecutively collected for a predetermined time T and analyzing C/I (Carrier to Interference) ratios consecutively calculated for the predetermined time T;

determining a number of signal strength bars to be displayed on the wireless terminal device based on the analysis result of analyzing the RSSI values and C/I ratios; and displaying said determined number of signal strength bars on the wireless terminal device, wherein the analyzing step further comprises:

a. consecutively collecting a predetermined number of RSSI values for a predetermined unit time t and storing the collected RSSI values;

b. consecutively calculating a predetermined number of C/I ratios for the predetermined unit time t and storing the calculated C/I ratios;

c. calculating an average value of n higher RSSI among the average values of the predetermined number of RSSI values (RSSI_AVR value) collected in step a and storing the calculated RSSI_AVR value;

d. calculating an average value of n higher C/I among the average values of the predetermined number of C/I ratios (C/I AVR value) calculated in step b and storing the calculated C/I_AVR value;

e. repeating steps a-d a predetermined number N times;

f. summing said N number of RSSI_AVR values obtained by the execution of step e and determining the sum of the RSSI_AVR values as an analysis result of the RSSI values for the predetermined time T; and g. summing said N number of C/I_AVR values calculated by the execution of step e, and determining the sum of the C/I_AVR values as an analysis result of the C/I ratios for the predetermined time T.

2. The method as set forth in claim 1, wherein step a is performed in such a manner that the predetermined unit time t is 240 ms in duration.

3. The method as set forth in claim 2, wherein 8 RSSI values are collected and stored during a period of 30 ms of the predetermined time T.

4. The method as set forth in claim 1, wherein step b is performed in such a manner that the predetermined unit time t is 240 ms in duration.

5. The method as set forth in claim 4, wherein 8 C/I ratios are collected and stored during a period of 30 ms of the predetermined time T.

6. The method as set forth in claim 1, wherein N equals 5.

7. The method as set forth in claim 1, wherein step f is performed in such a manner that excludes maximum and minimum values of the RSSI values collected in step a.

8. The method as set forth in claim 1, including an additional step of further summing the RSSI_AVR values using n number of RSSI values collected in step a, wherein n is greater than N.

9. The method as set forth in claim 1, wherein step g is performed in such a manner that C/I_AVR ratios excludes maximum and minimum values of the C/I ratios collected in step b.

10. The method as set forth in claim 1, including an additional step of further summing the C/I_AVR values using n number of C/I ratios collected in step b, wherein n is greater than N.

* * * * *